Nov. 3, 1964  W. R. SMITH  3,154,903
CUTTER UNIT SUSPENSION ARRANGEMENT FOR POWER MOWERS
Filed Oct. 31, 1962  2 Sheets-Sheet 1

INVENTOR.
WILLIAM R. SMITH
BY
*Browne, Schuyler, & Beveridge*
ATTORNEYS.

Nov. 3, 1964   W. R. SMITH   3,154,903
CUTTER UNIT SUSPENSION ARRANGEMENT FOR POWER MOWERS
Filed Oct. 31, 1962   2 Sheets-Sheet 2

INVENTOR.
WILLIAM R. SMITH
BY Browne, Schuyler, & Beveridge
ATTORNEYS.

United States Patent Office 3,154,903
Patented Nov. 3, 1964

3,154,903
CUTTER UNIT SUSPENSION ARRANGEMENT
FOR POWER MOWERS
William R. Smith, McDonough, Ga., assignor to McDonough Power Equipment, Inc., McDonough, Ga., a corporation of Georgia
Filed Oct. 31, 1962, Ser. No. 234,468
12 Claims. (Cl. 56—25.4)

This invention relates to power mowers and, more particularly, to structural arrangements for supporting the cutter unit of a power mower, and for adjusting the height of the cutter unit with respect to the ground surface. Structure according to the present invention has particular utility when embodied in a power mower where the operator rides on the mower.

One problem with which the present invention is concerned is enabling the cutter unit to follow substantially the contour of the ground surface over which the mower is traveling thereby avoiding uneven cutting and possible scalping of the ground plus resultant damage to the cutting element. This problem is solved effectively by structure according to the present invention whereby the cutter unit is suspended beneath the chassis of the mower and above the ground surface over which the mower travels while still following substantially the contour of the ground surface even though no ground engaging wheels or the like are provided on the cutter unit.

Another problem with which the present invention is concerned is to enable the height of the cutter unit with respect to the ground surface to be adjusted quickly and easily, and wherein an adjusted height of the cutter unit is maintained effectively without requiring excessive structure. This problem was solved effectively by cutter unit height adjustment structure according to the present invention which can be actuated quickly, relatively easily, and wherein the weight of the cutter unit acts constantly to maintain a given height adjustment.

It is therefore an object of the present invention to provide a new and improved power mower including cutter unit supporting structure which permits the cutter unit to follow substantially the contour of the ground over which the mower travels even though the cutter unit is out of contact with the ground surface.

It is another object of the present invention to provide such a power mower wherein the cutter unit is suspended beneath the mower chassis and does not engage the ground surface over which the mower travels. It is a further object of the present invention to provide such a power mower wherein, during travel over rough terrain, the rear edge of the cutter unit is anticipatorily elevated when the mower encounters undulations in the contour of the ground surface which might otherwise result in possible scalping of the surface by the lowest edge of the cutter unit.

It is still another object of the present invention to provide a power mower in which the height of the cutting unit above the ground surface may be adjusted quickly and easily while maintaining the cutter unit in a level condition.

In its preferred form, the invention features a tractor including a rear traction unit, a forward steering unit including steerable wheels, and a longitudinal frame member pivotally secured to the rear traction unit and fixedly secured to the steering unit. The cutter or mower unit per se, is mounted beneath the longitudinal frame member and has at each side thereof longitudinal channel members. A first transverse bearing bar is journaled at the forward end of each channel member while a similar transverse bearing bar is journaled in the rear portions of the channel members, the journaling of the two transverse bearing bars being along a line substantially parallel to the upper deck surface of the mower unit housing. Each transverse bearing bar forms a central pivot of pairs of bell-crank levers which operate as second order levers. A forwardly extending arm-pair of the bell-crank lever associated with the forward transverse bearing bar are pivotally connected to the front axle while a rearwardly extended arm-pair of the bell-crank lever associated with the rear transverse bearing bar are connected to the traction unit by means of collapsible, articulated or flexible links. Other arms of the bell-crank levers are interconnected by an intermediate link which crosses a line passing through the two transverse bearing bars to form a linkage chain for supporting and suspending the mower housing unit from the tractor. One of the bell-crank levers includes a further arm, referred to herein as a latching arm, which arm may be locked in various angular orientations relative to its transverse pivot by a scalloped cam so that the height of the mower unit relative to the tractor may be adjusted to thereby adjust the cutting height.

Other objects, advantages and features of the invention will become apparent from a consideration of the following specification, taken in conjunction with the accompanying drawings wherein.

Figure 1:
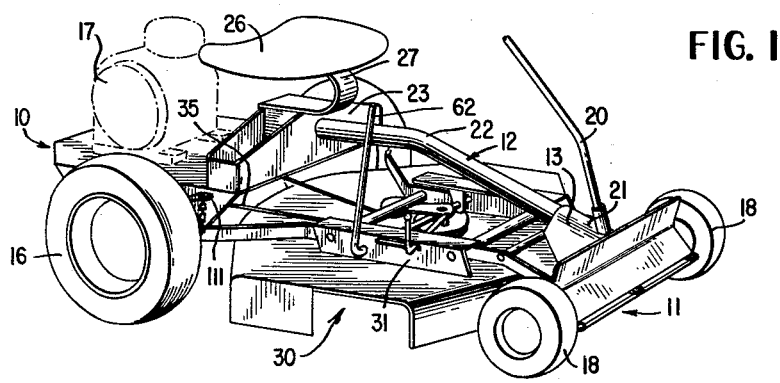
FIG. 1 is an isometric view of a tractor and mower unit incorporating the invention.

Referring now to the drawings, a riding tractor incorporating the invention comprises a rear traction unit generally designated by the numeral 10, a steering unit 11 and a tubular frame member 12 fixedly secured to the steering unit at 13 and journaled at its rear end in a bearing 14 in the traction unit 10.

Traction unit 10 includes a pair of driven wheels 16, drivingly engaged through a clutch mechanism (not shown) to the engine 17. The driving engagement such as the clutch, and controls for the engine 17 are conventional and are not shown in the drawings. The steering unit 11 includes a pair of steerable wheels 18 linked to a steering column or handle 20. The forward end of tubular frame member 12 is rigidly secured to the steering unit 11 by means of an upstanding U-shaped bracket 21 and extends rearwardly therefrom at an inclined angle to a bend therein at 22. The angle formed at 22 is of such a degree that the rear portion 23 of tubular frame member 12 is substantially parallel to the longitudinal axis of the tractor and horizontally disposed. The rear end 23 is journaled in a bearing 14 so that the steering unit may oscillate about the longitudinal axis of the tractor and in conformance with the terrain ahead of the traction unit 10. Locking pins 24 and 25 secure the tubular frame member 12 in bearing 14 and may be removed so that the steering unit and traction unit may be disassembled. An operator's seat 26 is mounted on a spring bracket 27 and is disposed slightly forwardly of the engine 17.

As thus far described, the tractor, including the traction unit 10, steering unit 11 and tubular frame member 12, is conventional.

Positioned between the rear traction unit 10 and forward steering unit 11 is a mowing unit 30 having secured on the upper deck surface thereof, a pair of opposed channel members 31. The mower unit 30 includes a conventional vertical shaft 32 having a sheave 33 on one end thereof and a cutting blade 34 on the lower end within the housing 36. The sheave 33 is drivingly coupled to a driving pulley (not shown) on motor 17 by means of an endless flexible belt 35 and said belt may be tightened by means of a belt tightener comprising idler pulley 100 rotatably mounted on the end of idler arm 101. Idler arm 101 is pivotable about spindle 32 by clutch handle 102 which extends through a slot 103 in right channel member 31 and is latched in an engaged or disengaged position by a latch mechanism (not shown).

Transverse bearing bar 37 is journaled at 38 and 39 in channel members 31. A pair of forwardly extending long arms 40 and 41 are rigidly secured to the transverse pivot bar 37, and are rigidly connected together by a cross bar 42. Rigid with, and depending downwardly from transverse bearing bar 37 is a short arm 43 which, preferably, is at an angle of about 90° to the long arms 40 and 41.

Figure 2:
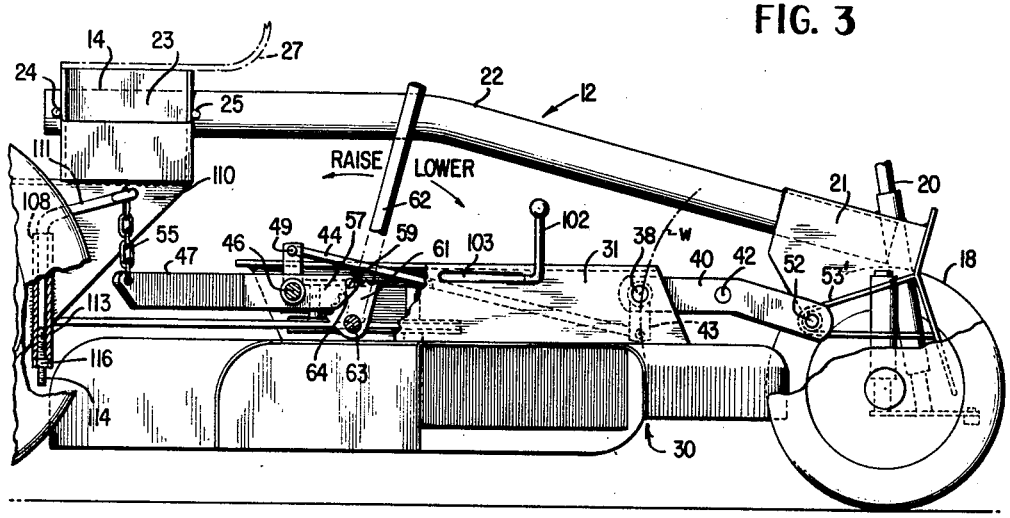
FIG. 2 is a side elevational view with a portion of a side channel member removed.

Transverse bearing bar 46, pivotally mounted at its ends in the rear end of the channel members 31, has rigid therewith a second pair of long arms 47 and 48 and an upstanding short arm 49. As shown in FIG. 2, the upstanding arm 49 and the depending arm 43 are connected by way of an intermediate link 44 which link guidingly constrains the movements of the arms in opposite directions.

The forward ends of arms 40 and 41 are spacedly pivotally mounted on a transverse pivot bar 52. Transverse pivot bar 52 is pivotally mounted in a rearwardly extending portion 53' of the frame 53 of the front steering unit. Thus arms 40 and 41, cross bar 42, transverse pivot bar 52 and transverse bearing bar 37 form a rigid frame link which constrains the mower unit 30 to rotate, with the steering unit 11, about a longitudinal axis of the tractor passing through bearing 14.

Tubular sockets 108 and 109 are rigidly secured to the chassis 110 of the traction unit 10 at each side thereof and each receives angulated bars 111 and 112, respectively. The lower end of each tubular socket 108 and 109 is internally threaded as at 113 (FIG. 2). Adjusting screw 114, threadably engaged with threads 113, is locked in place by a lock nut 116. The lower end of bars 111 and 112 rest on their respective adjusting screws.

Figure 3:
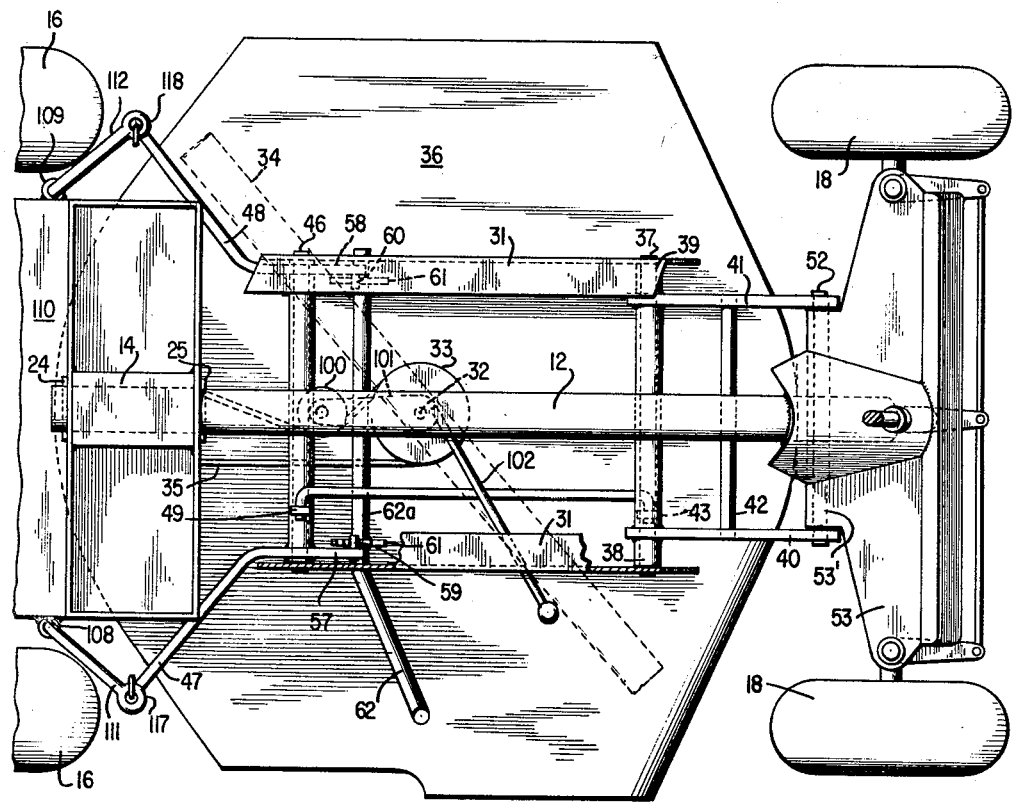
FIG. 3 is a top plan view showing the mower suspension.

As shown in FIG. 3, bars 111 and 112 diverge outwardly and terminate in eyes 117 and 118, respectively, located slightly forwardly of rear traction wheels 16. Collapsible link means such as chains 55 and 56 extend between eyes 117 and 118, respectively, and the rear ends of arms 47 and 48, respectively.

As thus far described, the mower unit 30 would rest on the ground since the linkage chain comprising long arms 40 and 41, short arm 43, intermediate link 44, short arm 49, rearwardly extending long arms 47 and 48 and chains 55 and 56, is not latched. If any one of the rigid links of the linkage chain were latched against movement, the linkage system would lock the mower housing at a selected location intermediate the ground surface and tubular frame member 12. In its preferred form, the linkage chain is latched by the provision of forwardly extending arms 57 and 58 rigid with transverse bearing bar 46 and rearwardly extending arms 47 and 48, respectively. Transverse to arms 57 and 58 are latching studs 59 and 60, respectively. Scalloped cams 61, rigid with a lift and height adjust handle 62, are pivotally mounted on channel member 31 by means of a transverse bar 62A. Movement of scalloped cams 61 about the pivot 63 moves bearing studs 59 and 60 into one of the scallops 64 to cause rotation of arms 57, 49 and 47 about the axis of transverse pivot rod 46. This rotation of arm 49 is coupled by means of intermediate link 44 to the short arm 43 to effect movement (in an opposite direction) of this arm about transverse pivot rod 37. Thus, arm-pairs 40, 41 and 47, 48 are caused to rotate in opposite directions to cause raising and lowering of the mower unit 30.

It should be noted that the effective length of forward arms 40, 41 and rearward arms 47, 48 are substantially equal and are substantially horizontal in the normal cutting height position. The distance between the pivot bar 52 and the pivot 37 is the radius of movement of pivot 37 about pivot bar 52. Thus, the front end of mower unit 30 must move along an arc "W" about the pivot 52 with the radius of the arc being equal to the effective length of the link or arm 41. Therefore, above and below the normal cutting height, the cutter unit is shifted forwardly a slight amount and since the arm 41 is substantially horizontal in its normal position, the amount of shift is negligible. Flexible links 55 and 56 permit this slight forward shifting of the cutting unit 30. In addition, rotation of links 47 and 48 about the axis of transverse bearing bar 46 forces pivot 46 to move along an arc which is shifted a longitudinal distance corresponding to the shifting movement of pivot arm 37 in a longitudinal direction. The weight of the mower unit would normally cause rotation of the forwardly extending arms 40 and 41 in a counterclockwise direction about pivot 52 and clockwise rotation of rearwardly extending arms 47 and 48 about transverse pivot bar 46. Thus, lugs 59 and 60 are urged into their respective scalloped portions 64 on scalloped cam 61 to thus lock the mower unit at a fixed distance relative to the tractor and thus avoids the necessity for latches, ratchets, etc.

Figure 5:
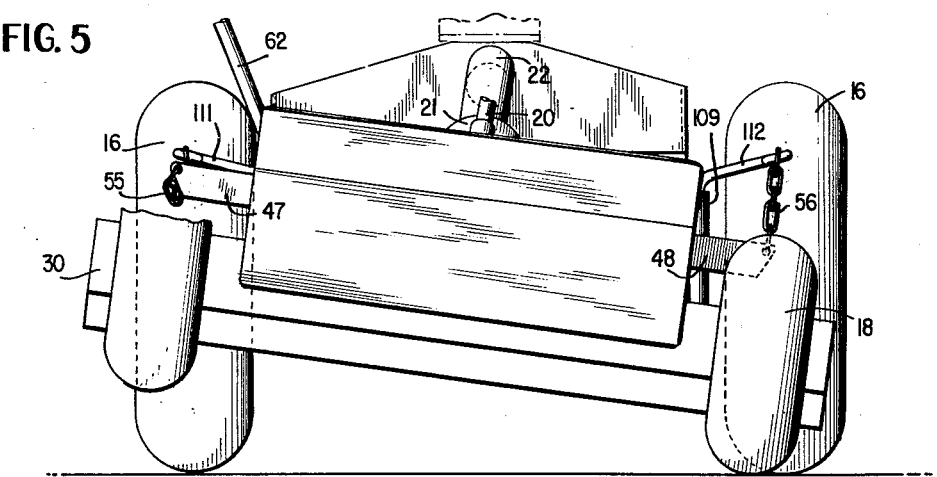
FIG. 5 is a front elevational view of a tractor incorporating the invention showing the oscillating movement of the mower unit so as to accommodate the uneven terrain over which the tractor is traveling.

Longitudinal frame member 12, being rigid with the front steering unit 11 and pivoted in bearing 14 of the rear traction unit, permits oscillatory movement of the front steering unit 11 relative to the rear traction unit 10 in accordance with changes in the terrain over which the tractor is traveling. This oscillating movement is coupled through arms 40 and 41 to the mower unit 30 and since these arms are locked, the mower unit 30 oscillates in accordance with the oscillatory movement of the steering unit 11 about a longitudinal axis of the tractor. As shown in FIG. 5, the movement of the mower unit 30 about the longitudinal axis of the tractor causes chain 55 to collapse and go slack and the mower unit is then suspended by one chain only, chain 56, at the lowest side of the mower unit.

Figure 4:
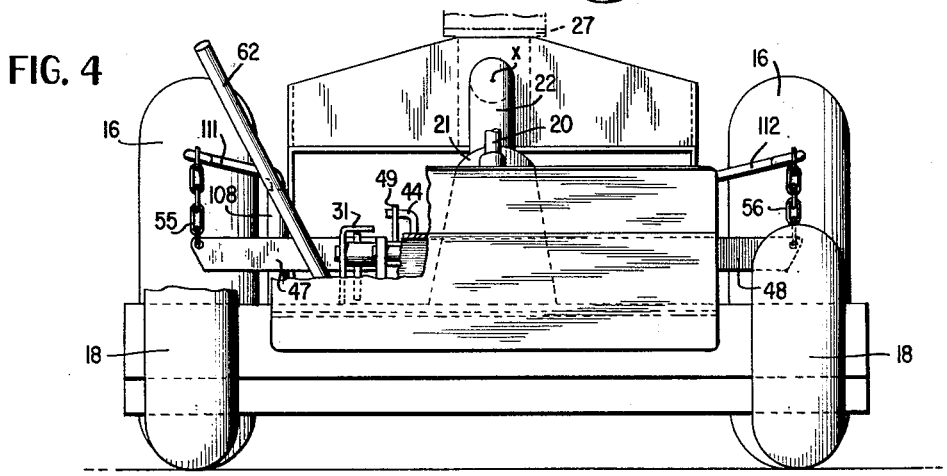
FIG. 4 is a front elevational view of a tractor incorporating the invention.

Since the longitudinal axis "X" (FIG. 4) about which the front axle and mower unit pivot is above the mower unit, there is a sideways motion of the mower unit with the result that the rear of the mower unit is raised because of the swinging of the tight chain 56 about an arc. The amount which the low side of the mower unit is raised is proportional to the angle through which the steering unit tilts or oscillates relative to the longitudinal axis of the mower, as modified by rotary movement of angulated bars 111 and 112 in sockets 108 and 109.

Thus, the flexible or collapsible links 55 and 56, in addition to suspending the rear of the mower unit, permits oscillatory movement of the mower unit with oscillatory movement of the steering wheel about the longitudinal axis of the tractor, and, at the same time, effects an anticipatory elevating movement of the rear end of the low side of the mower unit 30 during the tilting movement of the steering unit 11. In addition, the raising or elevating movement of the rear end of the mower unit is increasingly greater for large angles of tilt or oscillation of the steering unit than for small ones. Moreover, the flexible linkage suspension permits height adjustment of the mower unit.

It will be understood that angulated bars 111 and 112 may be stationary in sockets 108 and 109 or that eyes 117 and 118 may be rigid with some other portion of the chassis. In case eyes 117 and 118 are rigid or nonmovable relative to the chassis, then the modulating influence thereof on anticipatory elevations of the rear of mower unit 30 will be substantially eliminated.

It will also be understood that the angle of links 55 and 56 relative to the vertical affects the amount of anticipatory elevation of the rear of the mower unit 30 on oscillating movements of the steering unit 11. Thus, the chain links 55 and 56 may angle convergingly towards the ground to provide greater elevating movement of the rear end of mower unit 30 on oscillating movement of the steering unit 30, and with angulated bars 111 and 112 fixed in sockets 108 and 109 such anticipatory movement will be a function of the angle turned by the steering unit and therefore the anticipatory elevating movement will be a function of the undulations in the terrain over which the tractor travels. When angulated bars 111 and 112 are free to rotate in sockets 108 and 109, respectively, there is a modulation of the anticipatory height elevations of the rear of the mower unit 30 by a factor correspondingly proportional to the horizontal angle through which the bars 110 and 111 rotate. In all cases, however, the anticipatory elevation of the rear of the mower unit 30 is effected.

Although the apparatus of the present invention has been described particularly with reference to the suspension and adjustment of a cutter unit, it will be appreciated that the invention may be applied to other agricultural implements where the problems of suspension and height adjustment are the same.

It will be further appreciated by those skilled in the art that structure as described above whereby the cutter unit is maintained in suspended relation with respect to the chassis of a power mower, and can still follow substantially the contour of the ground surface over which the mower travels, may be employed without also employing structure as described above whereby the height of the cutter unit with respect to the ground surface may be adjusted quickly and easily, and vice versa. This is true for mowers where the operator walks as well as those where the operator rides on the mower. Insofar as the height adjustment structure is concerned, it could be employed in a mower wherein the cutter unit per se is supported partly or entirely by ground engaging wheels or the like.

Thus, while I have described and illustrated a preferred embodiment of my invention, I wish it to be understood that I do not intend to be restricted solely thereto, but that I do intend to cover all modifications thereof which would be apparent to one skilled in the art and which come within the spirit and scope of my invention.

What is claimed is:

1. A power mower comprising in combination a traction unit including a carriage supported between a pair of traction wheels and a motor mounted on said carriage operably connected to said traction wheels,
   a steering unit,
   a longitudinal frame member extending between and interconnecting said steering unit with said traction unit, said longitudinal frame member including a pivotal connection to one of said units,
   a cutter unit including
      a housing,
      a vertical shaft journalled in said housing,
      a cutting blade on one end of said shaft and
      a drive coupling to said motor on the other end of said shaft,
   suspension means for said cutter unit comprising
      a pair of front arms extending forwardly of said housing,
      means pivotally connecting the forward end of said front arms to said steering unit,
      a pair of rear arms extending rearwardly of said housing,
   chains connecting the rearward ends of said rear arms to said traction unit so that when said frame member pivots about its pivotal connection to one of said units the chain between one of said rear arms and said traction unit swings about an arc to elevate the rear edge portion of said cutter unit and pivots said cutter unit about said means connecting said front arms to said steering unit in an upward direction,
   and means for effecting relative rotation of said front and said rear arm pairs in opposite directions to change the relative vertical position of said cutter unit with respect to said tractor.

2. A riding power mower comprising in combination a traction unit including a carriage supported between a pair of traction wheels and a motor mounted on said carriage operably connected to said traction wheels,
   a forward wheeled unit,
   a longitudinal frame member extending between and interconnecting said forward wheeled unit with said traction unit, said longitudinal frame member including a pivotal connection to one of said units,
   a mower unit including
      a housing,
      a vertical shaft journalled in said housing,
      a cutting blade on one end of said shaft and
      a drive coupling to said motor on the other end of said shaft,
   means pivotally mounting the forward end of said mower unit to said steering unit at at least two spaced points parallel with a transverse axis of said steering unit,
   collapsible link means between at least two spaced points disposed at opposite sides of the longitudinal frame member on the rearward end of said mower unit and at least two laterally spaced points on said traction unit,
   whereby oscillating movements of said longitudinal frame member about a longitudinal axis of said mower effects oscillating movement of said mower unit about the same longitudinal axis so that one of said collapsible link means collapses between its respective points of connection to the mower unit and the traction unit and at least another of said collapsible link means guides the other side of said mower unit about an arc having as the center thereof, the point of connection of said another collapsible link means to said traction unit.

3. A riding power mower comprising in combination a traction unit including a carriage supported between a pair of traction wheels and a motor mounted on said carriage operably connected to said traction wheels,
   a steering unit having laterally spaced steerable wheels,
   a longitudinal frame member fixedly secured to said steering unit and pivotally secured to said traction unit above the securement of said frame member to said steering unit,
   a mower unit including
      a housing,
      a vertical shaft journalled in said housing,
      a cutting blade on one end of said shaft and
      a drive coupling to the motor on the other end of said shaft,
   means pivotally supporting the forward end of said housing on said steering unit, and
   a pair of flexible link means laterally spaced on opposite sides of said longitudinal frame member supporting the rear end of said mower unit from said traction unit,
   the arrangement being such that an anticipatory raising of the rear end of the mower unit is effected when one front wheel of the steering unit is at a different elevation relative to the other front wheel and the rear traction wheels.

4. A riding power mower comprising in combination a traction unit including a carriage supported between a pair of traction wheels and a motor mounted on said carriage operably connected to said traction wheels,
   a steering unit having laterally spaced steerable wheels,
   a longitudinal frame member fixedly secured to one of said units and pivotally secured to the other of said units so that said units can oscillate about a longitudinal axis of the tractor relative to each other,
a mower unit including
- a housing,
  - at least a portion of the forward end of said housing extending between the wheels on said steering unit,
  - at least a portion of the rear end of said housing extending rearwardly between the traction wheels on said traction unit,
- means pivotally mounting the forward end of said mowing unit to said steering unit,
- and a pair of laterally spaced flexible link means for suspending the rear end portion of said housing from said carriage at laterally spaced points on said carriage and at opposite sides of said frame member above the rear end portion of said housing.

5. A riding power mower comprising in combination a traction unit including a carriage supported between a pair of traction wheels and a motor mounted on said carriage operably connected to said traction wheels,
a steering unit,
a longitudinal frame member,
means rigidly securing one end of said longitudinal frame member to one of said units,
means pivotally securing the other end of said longitudinal frame member to the other of said units,
a mower unit,
means pivotally mounting the forward end of said mower unit on said steering unit
and means spaced laterally of said longitudinal frame member suspending the rear end of said mower unit from said traction unit,
one of said laterally spaced means effecting an elevating movement on the rear edge of said mower unit on changes in the angular position of said steering unit relative to said traction unit.

6. A riding mower according to claim 5 wherein said last-named means comprises a pair of laterally spaced collapsible links.

7. A riding mower according to claim 6 wherein said collapsible links extend downwardly from said traction unit at an angle from 90° relative to the horizontal to an angle where said laterally spaced collapsible links are included in lines which converge at a point below said longitudinal frame member.

8. A riding mower according to claim 5 wherein said means suspending the rear end of said mower unit from said traction unit is fixed relative to said traction unit.

9. A riding mower according to claim 5 wherein said means suspending the rear end of said mower unit from said traction unit is effective to modify the elevating movement of the rear of said mower unit as a function of the turning movement of the steering unit about the longitudinal axis of the tractor.

10. A riding mower according to claim 5 wherein said means suspending the rear end of said mower unit from said traction unit includes an eye pivotally mounted on said traction unit for movement in a horizontal plane relative to said traction unit.

11. In a power mower apparatus having forward wheel means pivotally connected to rear wheel means by a frame member, permitting relative turning movement between said forward and said rearward wheel means about a longitudinal axis of said apparatus, and a cutter unit connected to said forward wheel means with respect to said frame member for pivotal movement about an axis transverse to said longitudinal axis and with respect to said forward wheel means for turning movement therewith about said longitudinal axis, the forward end of said cutter unit being supported above ground by said forward wheel means,
- the improvement in the rear suspension of the cutter unit which comprises;
- at least one pair of suspension means suspending the rear of the cutter unit from the rear wheel means at points on opposite sides of said longitudinal axis so that, on relative turning movement between said forward and said rearward wheel means about said longitudinal axis, the rear of said cutter unit is raised and suspended from said rear wheel means solely by one of said suspension means.

12. A power mower apparatus as defined in claim 11 wherein each of said suspension means comprises collapsible link means.

References Cited by the Examiner

UNITED STATES PATENTS

| | | | |
|---|---|---|---|
| 2,681,536 | 6/54 | Kuhary et al. | 56—25.4 |
| 2,848,859 | 8/58 | Abel | 56—25.4 |
| 2,924,928 | 2/60 | Rhoades et al. | 56—25.4 |
| 2,928,223 | 3/60 | Danuser | 56—25.4 |
| 2,972,850 | 2/61 | Ariens et al. | 56—25.4 |
| 3,063,226 | 11/62 | Pfauser | 56—25.4 |
| 3,077,065 | 2/63 | Samways et al. | 56—25.4 |

T. GRAHAM CRAVER, *Primary Examiner.*

J. SPENCER OVERHOLSER, ARNOLD RUEGG, ANTONIO F. GUIDA, *Examiners.*